US010282278B2

(12) United States Patent
Zimmermann et al.

(10) Patent No.: US 10,282,278 B2
(45) Date of Patent: May 7, 2019

(54) VISUALIZATION OF DEPENDENCY CHECK OUTCOMES AND ERROR RESOLUTION

(71) Applicant: SAP SE, Walldorf (DE)

(72) Inventors: Cora Zimmermann, Belmont, CA (US); Jan Loehe, Bruchsal (DE); Balazs Rabel, Eppelheim (HU); Ning Gao, Rauenberg (DE)

(73) Assignee: SAP SE, Walldorf (DE)

( * ) Notice: Subject to any disclaimer, the term of this patent is extended or adjusted under 35 U.S.C. 154(b) by 152 days.

(21) Appl. No.: 15/227,473

(22) Filed: Aug. 3, 2016

(65) Prior Publication Data
US 2018/0039564 A1 Feb. 8, 2018

(51) Int. Cl.
*G06F 11/00* (2006.01)
*G06F 11/36* (2006.01)
*G06F 3/0482* (2013.01)
*G06F 11/32* (2006.01)

(52) U.S. Cl.
CPC ........ *G06F 11/3664* (2013.01); *G06F 3/0482* (2013.01); *G06F 11/327* (2013.01)

(58) Field of Classification Search
CPC .. G06F 11/3664; G06F 11/327; G06F 11/321; G06F 11/324; G06F 11/328; G06F 3/0482; G06F 3/0484
See application file for complete search history.

(56) References Cited

U.S. PATENT DOCUMENTS

| | | | | |
|---|---|---|---|---|
| 8,701,023 | B1* | 4/2014 | Zhaksilikov | H03K 19/0175 326/62 |
| 2003/0200487 | A1* | 10/2003 | Taninaka | G06F 11/0727 714/42 |
| 2005/0015639 | A1* | 1/2005 | Cornelius | G06F 3/0481 714/1 |
| 2006/0200524 | A1* | 9/2006 | Costenaro | G06Q 10/107 709/206 |
| 2018/0046620 | A1* | 2/2018 | Sasaki | G06F 17/302 |

* cited by examiner

*Primary Examiner* — Philip Guyton
(74) *Attorney, Agent, or Firm* — Mintz Levin Cohn Ferris Glovsky and Popeo, P.C.

(57) ABSTRACT

A system, a method, and a computer program product for visualizing an outcome of dependency checks and resolution of errors in various software applications are disclosed. At least one first configuration setting in a plurality of configuration settings for a software application is selected. At least one first graphical notification identifying an error preventing execution of the first configuration setting and another configuration setting in the plurality of configuration settings are generated and displayed. The first graphical notification is displayed on a user interface adjacent to a graphical location on the user interface associated with another configuration setting. At least one solution to the error is executed based on the at generated first graphical notification. An absence of errors preventing execution of the plurality of configuration settings is determined and the plurality of configuration settings is executed.

20 Claims, 16 Drawing Sheets

VISUALIZATION OF DEPENDENCY CHECK OUTCOMES AND ERROR RESOLUTION

TECHNICAL FIELD

This disclosure relates generally to data processing and, in particular, to visualizing the outcome of dependency checks and resolution of errors in various software applications.

BACKGROUND

In today's world, many companies rely on software applications to conduct their business. Software applications deal with various aspects of companies' businesses, which can include finances, product development, human resources, customer service, management, and many other aspects. Software applications typically operate from servers and can be stored in memory. To use software applications, users typically employ various computing devices. User interfaces provide users with an ability to provide instructions to software applications, interact with other users, and perform various functionalities in furthering their company's business.

User interfaces can include a variety of software tools that can be generated by the corresponding software applications. The tools can assist users with performing their tasks, such as word processing, graphics creation, application development, etc. User interfaces can be used for planning purposes, which can include selection of various processes, settings, rules, values, etc. associated with how certain data and/or processes will be handled. Sometimes selection of a specific process, setting, rule, value, etc. and/or a set of processes, settings, rules, values, etc. can conflict with other processes, settings, rules, values, etc., thereby preventing user from operating its system. Current ways of notifying users of such conflicts unnecessarily consume space on a user interface and do not provide sufficient guidance to the user how to resolve such conflicts.

SUMMARY

In some implementations, the current subject matter relates to a computer implemented method for visualizing an outcome of dependency checks and resolution of errors in various software applications. The method can include selecting at least one first configuration setting in a plurality of configuration settings for a software application, generating and displaying at least one first graphical notification identifying an error preventing execution of the first configuration setting and at least another configuration setting in the plurality of configuration settings. The first graphical notification can be displayed on a user interface adjacent to a graphical location on the user interface associated with another configuration setting. The method can further include executing, based on the generated first graphical notification, at least one solution to the error, and determining absence of errors preventing execution of the plurality of configuration settings and executing the plurality of configuration settings. At least one of the selecting, the generating and displaying, the executing, and the determining can be performed using at least one processor of at least one computing system.

In some implementations, the current subject matter can include one or more of the following optional features. The method can also include generating and displaying, based on the executed solution, at least one second graphical notification identifying another error preventing execution of at least one second configuration in the plurality of configuration settings. The second configuration setting can be dependent on the first configuration setting. The second graphical notification can be displayed on the user interface adjacent to a graphical location on the user interface associated with the second configuration setting. The method can further include executing, based on the generated second graphical notification, at least another solution to the another error.

In some implementations, at least one of the first configuration setting and second configuration setting can relate to at least one object (e.g., document, spreadsheet, and/or any other object) executed by the software application. At least one of the first configuration setting and second configuration setting can also relate to a plurality of objects (e.g., embedded and/or multi-level spreadsheets) executed by the software application.

In some implementations, the above selecting, generating and displaying at least one first graphical notification, executing at least one solution to the error, generating and displaying at least one second graphical notification, executing at least another solution to another error, and determining can be performed using at least one planning view generated by the software application.

In some implementations, the generated notification can include an explanation of the conflict and an indication of at least one solution to resolve the conflict.

In some implementations, the first configuration setting and/or the second configuration setting can relate to at least one of the following: a time range setting, a planning level setting, a key figure setting, a version setting, a scenario setting, an alert setting, and any combination thereof.

In some implementations, the method can include preventing the executing of the plurality of the settings upon determination that at least another conflict exists between the first configuration setting and the second configuration setting.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to efficiently notify a user of a various conflicts that may exist in the data, settings and/or configurations related to a software application(s) being used by the user as well as guide the user to the resolution of such conflicts. In some implementations, the current subject matter can generate a graphical notification (e.g., through use of icons with graphical tooltips displayed in the user interface, etc.) to the user of such conflicts after performing checking of dependencies among various data, settings and/or configurations in software applications. The notifications can include guidance to the user on how to resolve errors and/or conflicts generated based on the check of dependencies. By way of a non-limiting example, a software application can generate a user interface that can include one or more parameters, which can be defined through various settings, configurations, etc., where settings, configurations, etc. can be presented in various segments of the user interface (e.g., sections of user interface, tabs, pop-ups, etc.). Changes to the settings, configurations, etc. in one segment of the user interface can render other parameters in the current segment and/or other segments, including other active, currently hidden, closed, etc. segments invalid and/or non-existing. The current subject matter can generate and display a graphical (and/or other type) notification to the user (e.g., upon user changing a single setting, configuration, etc.), which can advise the user of a conflict that has been created as a result of user's actions. The graphical notification(s) can guide the user which settings need to be adjusted and/or how they need to be adjusted as well as which setting may need to be adjusted next. This can be accomplished without a substantial disruption of the user interface and/or graphically blocking user's view of various segments of the user interface.

Figure 1:
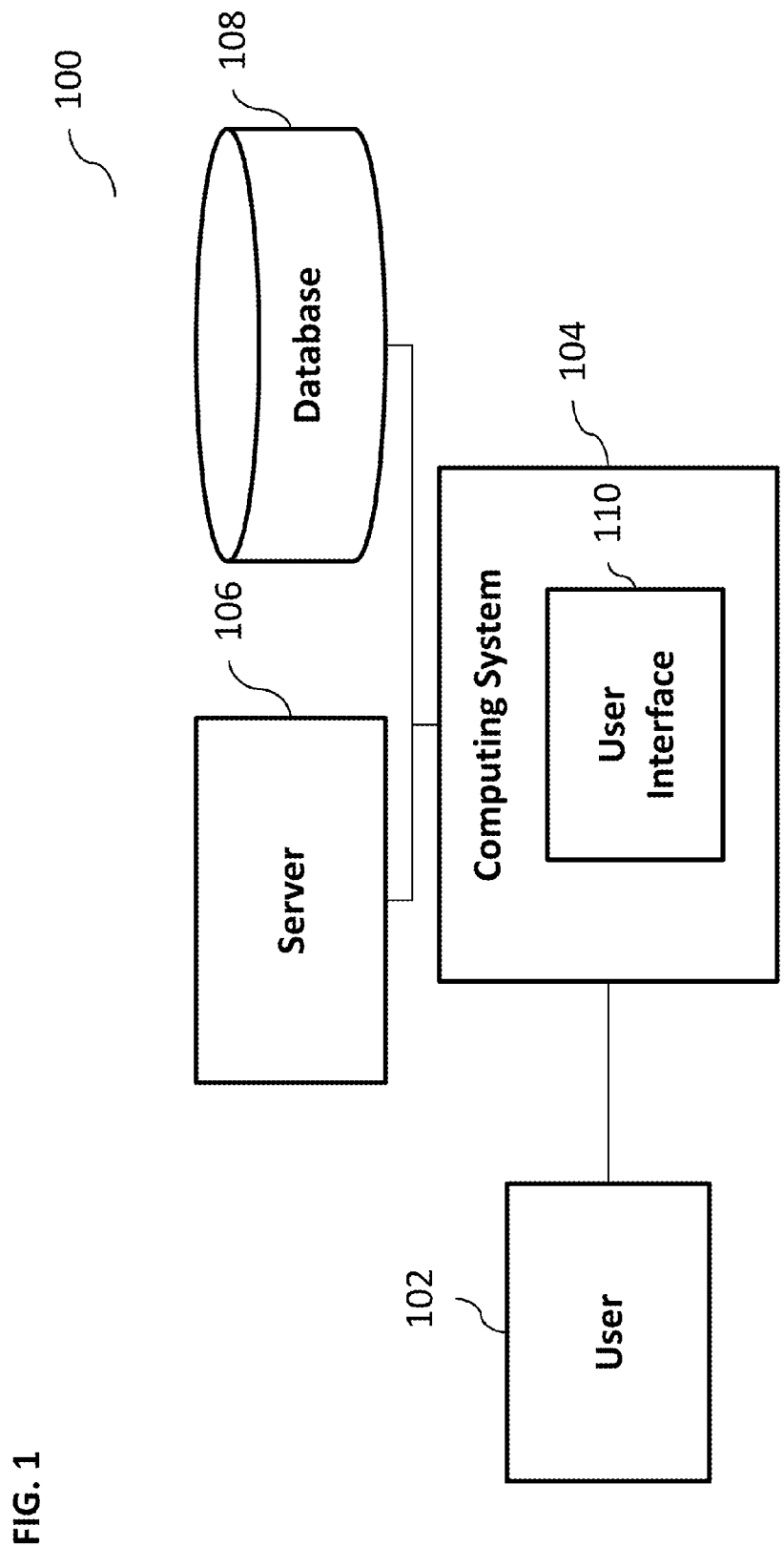
FIG. 1 illustrates an exemplary system for performing a dependency check, according to some implementations of the current subject matter.

FIG. 1 illustrates an exemplary system 100 for performing a dependency check, according to some implementations of the current subject matter. The system 100 can include a computing system 104, a server 106, and a database 108. A user 102 can access the computing system 104 for performing various tasks. The user 102 can be an individual user, a software application, a process, and/or any other user and/or any combination thereof. The computing system 104 can include software, hardware, and/or any combination thereof. The system 104 can be communicatively coupled to the user 102, the server 106, and/or the database 108. The server 106 can perform various functionalities, e.g., obtaining and/or storing data from/to the database 108. The database 108 can store various data, including metadata, which can be used by the system 100 for performing various functions.

In some implementations, the computing system 104 can be used to execute various interactive computer software applications that can be used for organization, analysis and/or storage of data in various (e.g., tabular) format (e.g., Microsoft Excel®, and/or any other type of software). Alternatively, the computing system 104 can be used to execute any type of software applications. The user 102 can use these applications to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate a user interface 110. The user interface 110 can be generated and presented to the user 102 by the computing system 104 (e.g., on a computer screen monitor, etc.). In exemplary, non-limiting implementations, the user interface can contain a planning view that can allow the user to perform various planning functionalities.

For the purposes of discussion and ease of illustration, the following discussion is presented in connection with a planning view and use of an add-in functionality, but as can be understood, the current subject matter system can be a standalone computing application capable of generating a user interface that can provide the user with notification(s) indicative of various issues, where issues can be representative of conflicts resulting from user's actions, such as changing settings, configurations, etc. The notifications can allow and guide the user in resolution of the issues within the application (e.g., correction of parameters, settings, configurations, data values, key figures, etc.).

Figure 2:
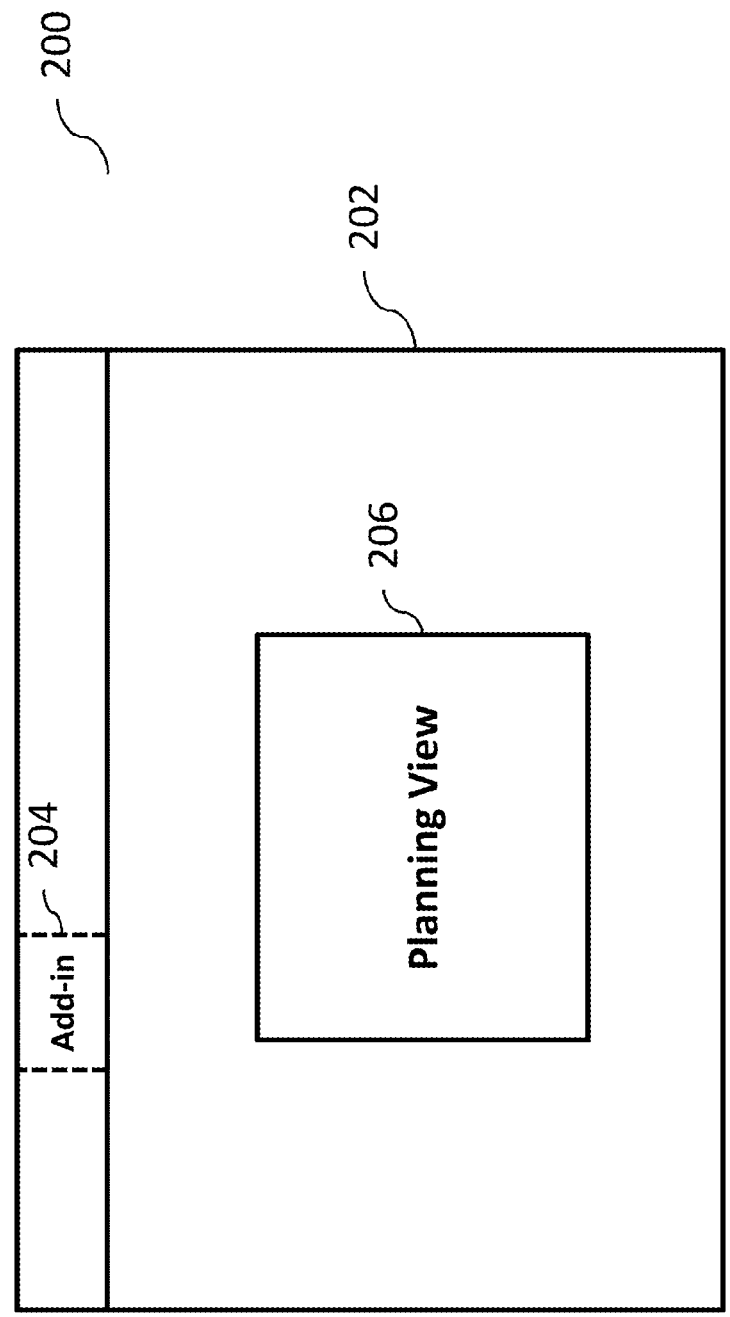
FIG. 2 illustrates an exemplary user interface that can be used for the purposes of planning, according to some implementations of the current subject matter.

FIG. 2 illustrates an exemplary user interface 200 that can be used for the purposes of planning, according to some implementations of the current subject matter. The user interface 200 can be generated by the system 100 as shown in FIG. 1. The user interface 200 can be used to activate and/or display various planning software applications 202. The software application 202 can be a spreadsheet type application (e.g., Microsoft Excel®, and/or any other type of software) and include an add-in functionality 204. Upon activation (e.g., clicking with a mouse, etc.), the functionality 204 can generate a planning view 206. The planning view 206 can be generated by a graphics processor implemented by the computing system 104 (as shown in FIG. 1). The planning view 206 can use various data and/or functionalities that can be obtained from various sources (e.g., server 106, database 108, and/or any other sources). As stated above, the current subject matter is not limited to the above exemplary implementation, whereby the software application 202 can be any software application, which may or may not include an add-in functionality, and the planning view 206 can be any user interface and/or any other view.

Referring back to FIG. 1, in some implementations, the user 102 can use the planning view for the purposes of planning, sales, marketing, finance and/or any other purposes. The user 102 can generate any other views for any other purposes. The user 102 can activate planning views using the add-in functionality (or be used as a standalone product) to perform various tasks during the planning process. The user 102 can generate a planning view from a blank, using at least one predefined template, and/or in any other way. To change the generated planning view, the user can activate an "Edit Planning View" functionality (e.g., using add-in 204 as shown in FIG. 2). The "Edit Planning View" functionality can be used to edit view settings, which can include "time range(s)", "planning level(s)", "key figure(s)", "version(s)", "scenario(s)", "alert(s)", etc.

Figure 3:
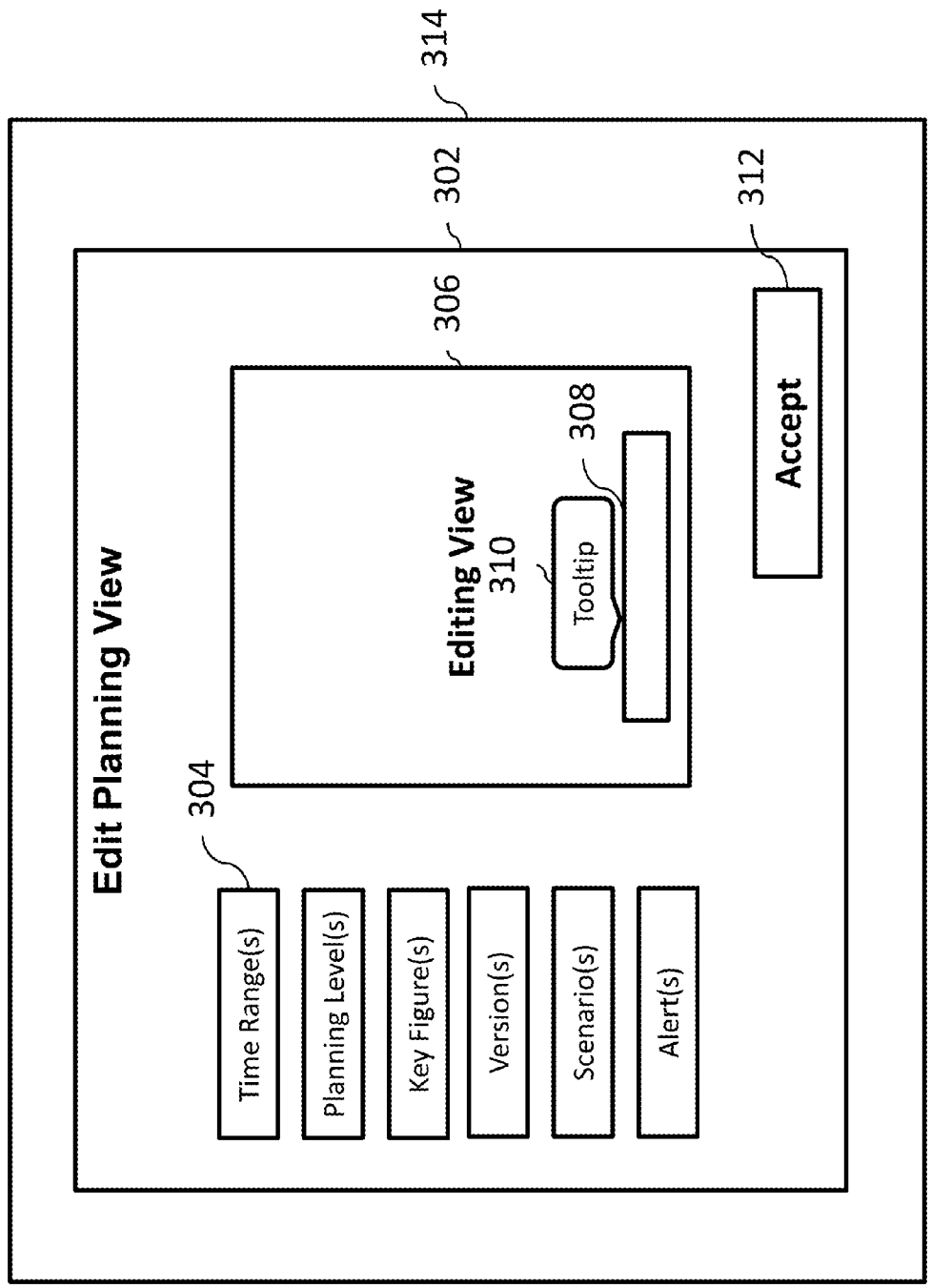
FIG. 3 illustrates an exemplary user interface containing an "Edit Planning View" functionality activated within a software application, according to some implementations of the current subject matter.

FIG. 3 illustrates an exemplary user interface 302 containing an "Edit Planning View" functionality activated within a spreadsheet software application 314, according to some implementations of the current subject matter. The edit planning view 302 can include view settings 304 (e.g., "time range(s)", "planning level(s)", "key figure(s)", "version(s)", "scenario(s)", "alert(s)", etc.), an editing view 306 and an "accept" button 312. As can be understood, any other settings, views, etc. can be used. In some implementations, the settings 304 can include and/or be associated with various dependencies. For example, the scenarios and versions available for "alerts" setting can be limited to those that that have been previously selected. If the dependency among the selected settings cannot be fulfilled, an error message can be generated. The editing view 306 can display an error message in a tooltip window 310 next to the specific setting 308 that has been selected. The tooltip 310 can be displayed anywhere in the edit planning view user interface 302. The tooltip 310 can be a pop-up window and can be generated as a result of the system 100 finding inconsistency among user-selected settings (e.g., a violation of a dependency between settings; for example, a selected key figure does not match a selected version of data). The tooltip 310 can be displayed, for example, upon user 102 (as shown in FIG. 1) hovering user's computer mouse (and/or any other device) over a specific setting that has an error.

In some implementations, the current subject matter is capable of generating a notification to the user 102 when a specific selection of settings or an attempt at selection of settings cannot be accomplished or fulfilled. The notification can include a graphics notification, a text notification, an audio notification, an image, a video notification, a tooltip, and/or any other type of notification, and/or any combination thereof. Upon selection of a specific setting, the current subject matter can perform a check of dependencies on other settings. The check can be performed automatically, manually, and/or in any other fashion. The check can be performed by processors of the system 100 (as shown in FIG. 1) and can be based on various rules that can be associated with a particular setting. It can also include comparison of various values associated with each setting to determine whether the values match and/or do not match. If there is no match, e.g., a violation of a dependency has been detected, the current subject matter system can generate a notification and present it to the user 102 (e.g., display it on the user interface). Other ways of determining whether a violation exists can be used. The current subject matter system can also indicate to the user what needs to be done to remove the violation. This can include various step-by-step instructions that can be displayed to the user 102 in the tooltip 310 along with the violation description. The tooltip 310 can indicate where the violation occurred and/or can be graphically positioned on the user interface (such as by using graphics coordinates of the violation) next to the location of the violation.

In some implementations, the current subject matter system, upon detection of selection of a particular setting, can preemptively deactivate other settings that can cause a dependency violation. Once the user has selected a particular setting, the system 100 (as shown in FIG. 1) can perform a dependency check with other settings and determine which settings cannot be selected by the user 102. The system 100 can also display the tooltip 310 to advise the user that selection of one setting has deactivated user's ability to select other settings and what user can do to change that and/or override the deactivation of other settings.

In some implementations, the current subject matter system can prevent the user 102 from accepting specific settings when a violation of a particular dependency has been detected. For example, this can be accomplished by deactivating the button 312. The button 312 can allow the user 102 to accept various settings that have been selected by the user 102 in the edit planning view 302. The button 312 can become activated when there are no dependency violations that have been detected and/or when all dependency violations have been resolved and/or when the user 102 has sufficient authorization to override dependency violations (e.g., through use of administrator rights, etc.). In some implementations, if the button 312 is deactivated (i.e., a violation has been detected but not resolved), pointing to the button can cause the system to display what the error is and how to resolve it.

In some implementations, the current subject matter system can be preloaded with various predetermined planning view configurations that can be activated by the user 102 upon selection of a specific setting in the edit planning view 302. The configurations can include an automatic dependency violation check performed upon loading and/or have the check performed prior to loading. The configurations can also allow an automatic performance of correction of dependency violations upon detection of such violations.

Figure 4:
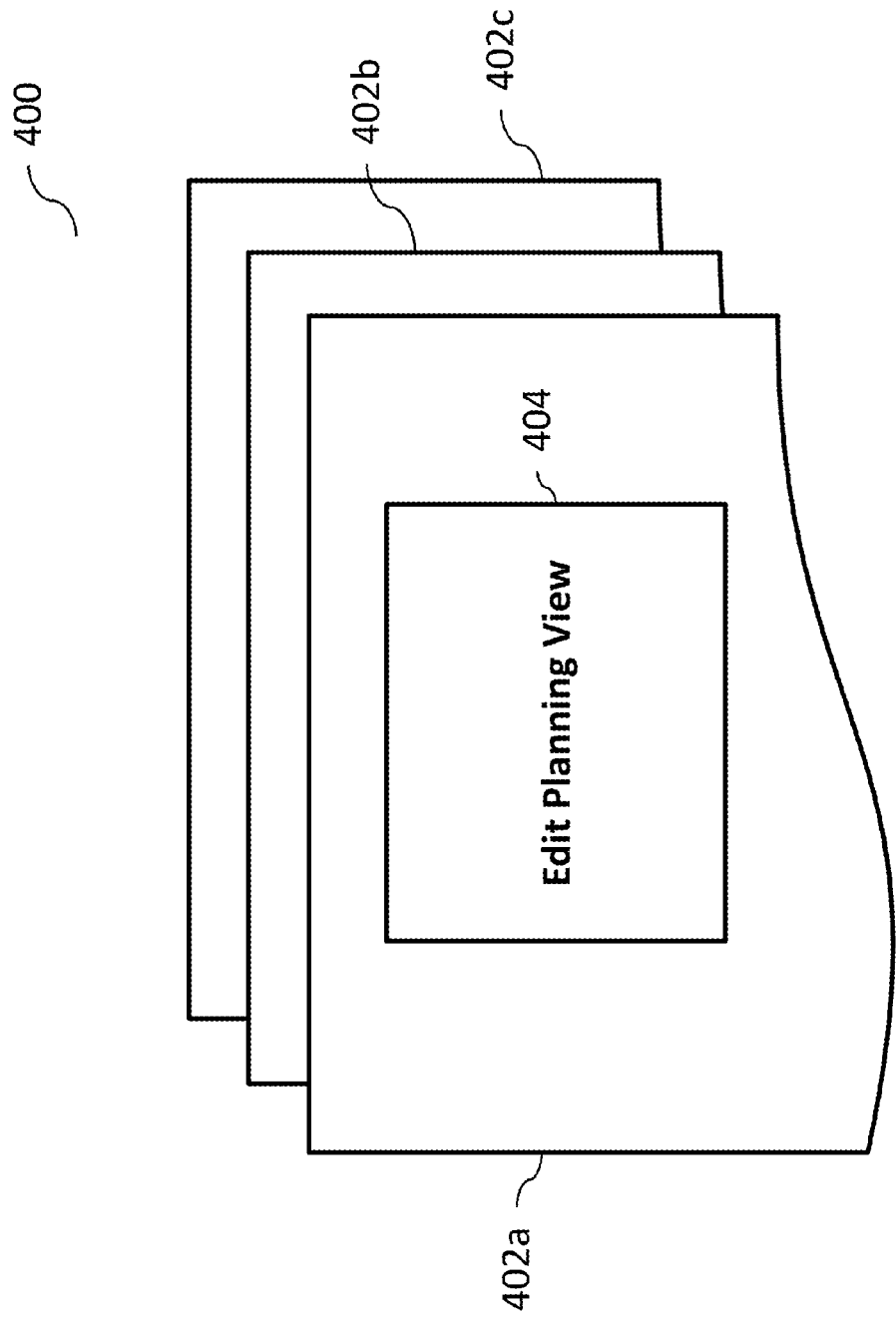
FIG. 4 illustrates an exemplary multi-spreadsheet (or multi-document or multi-object) user interface that can be configured using a single edit planning view, according to some implementations of the current subject matter.

FIG. 4 illustrates an exemplary multi-spreadsheet (or multi-document or multi-object) user interface 400 that can be configured using a single edit planning view, according to some implementations of the current subject matter. As shown in FIG. 4, a single edit planning view 404 can be used to configure settings for spreadsheets and/or documents and/or objects 402 (a, b, c). The objects can be active and/or inactive and/or hidden and can include sections of the user interface, tables, nested tables, settings, configurations, graphical objects, video objects, text objects, and/or any other objects and/or any combination thereof. Since several spreadsheets/documents/objects can be configured in one planning view, a dependency check can be triggered on each spreadsheet/document/object level. For example, a dependency check can reveal that selection of a setting in spreadsheet/document/object 402a can violate a setting selection in the spreadsheet/document/object 402c. In this case, a notification and/or an error icon can be generated on one or more and/or each spreadsheet/document/object level, in case that a dependency cannot be fulfilled on the corresponding spreadsheet/document/object. The current subject matter system can also provide the user 102 with an icon with a tooltip (similar to tooltip 310) that can advise the user of what the error is and how to resolve it.

Figure 5A:
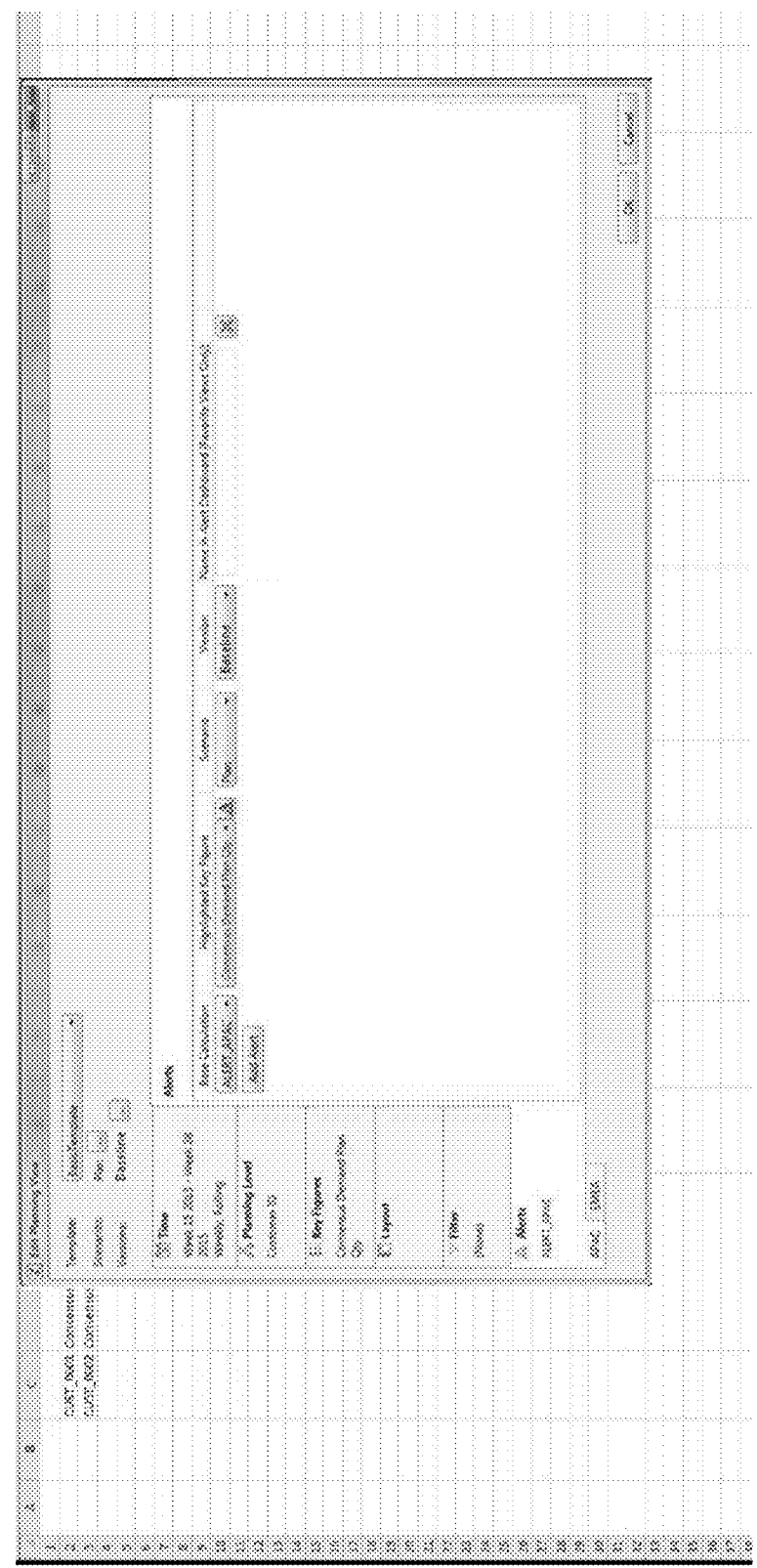
FIGS. 5a-5j illustrate various exemplary user interfaces showing dependency checking and error resolution using the system, according to some implementations of the current subject matter.

FIGS. 5a-5j illustrate various exemplary user interfaces 502-520 showing dependency checking and error resolution using the system 100, according to some implementations of the current subject matter. The user interfaces shown in FIGS. 5a-5j can be generated by the system 100 in accordance with the discussion above. FIG. 5a illustrates an exemplary user interface 502 showing dependencies between settings (e.g., "scenarios" setting and "versions" available for "alerts" setting can be limited to the ones selected as shown in FIG. 5a). Using the user interface 502, the user can build a planning view based on various settings, which can include, for example, "time range(s)", "planning level(s)", "key figure(s)", "version(s)", "scenario(s)", "alert(s)", etc. When there are no errors that are displayed in the user interface 502, the "OK" button can be active, i.e., the user can click it to accept selected settings.

Figure 5B:
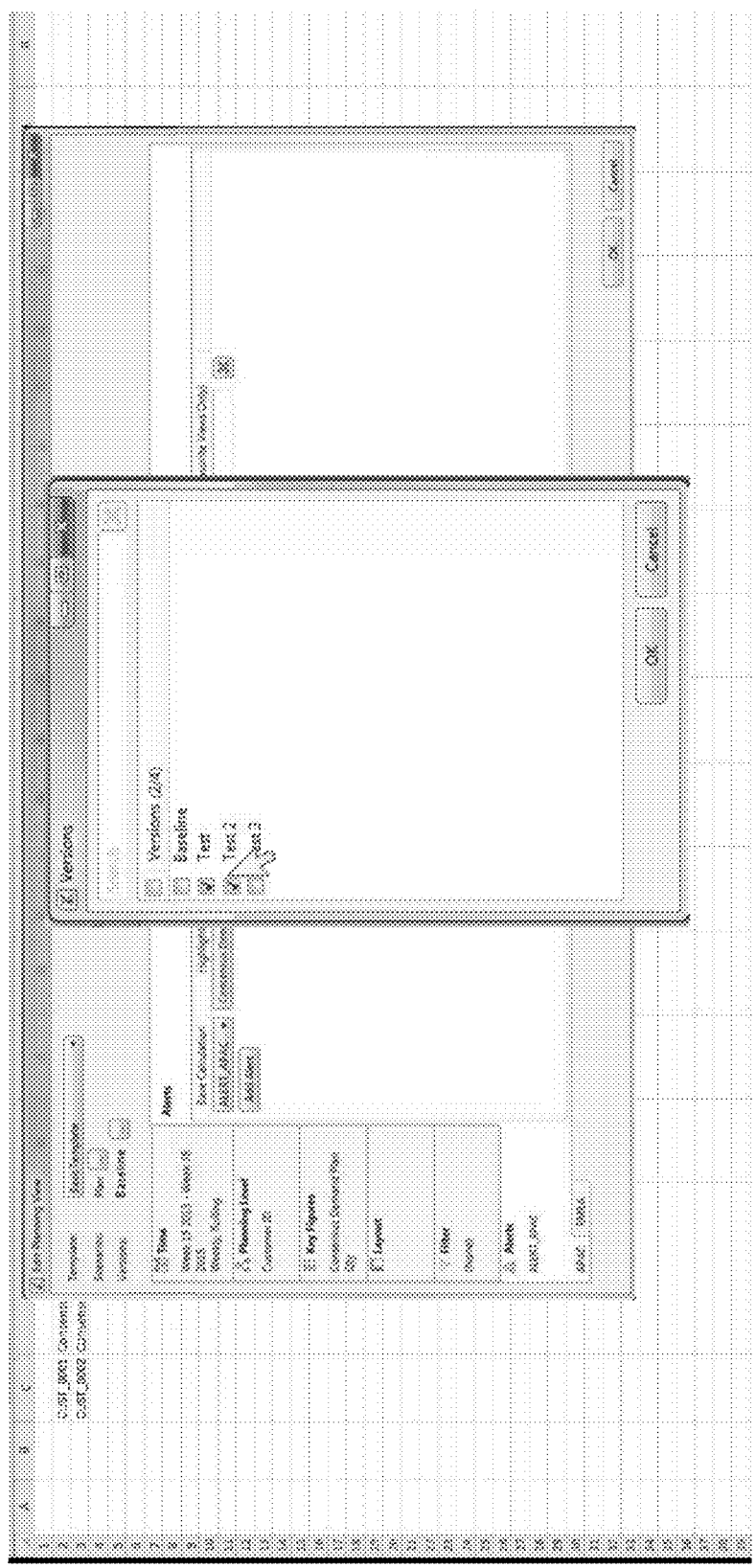
Figure 5C:
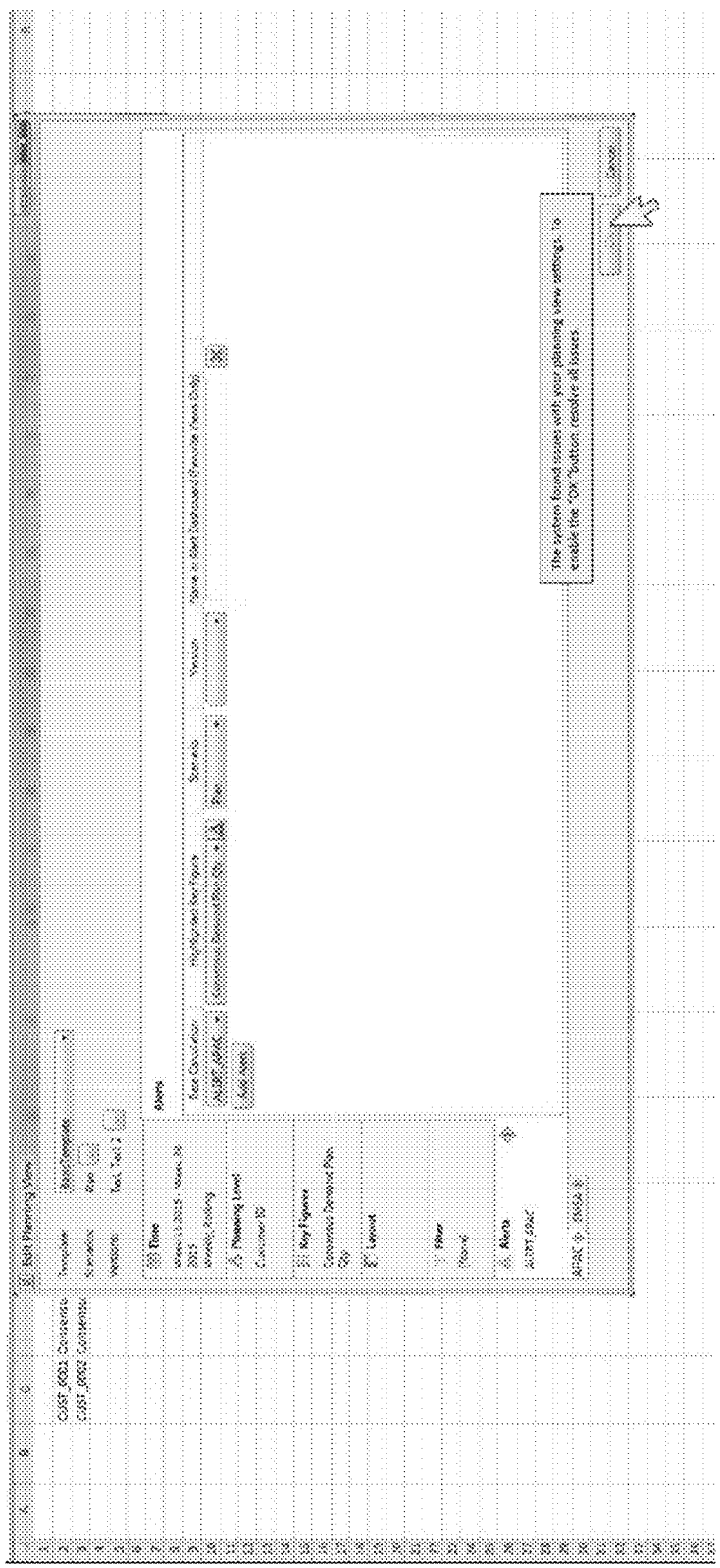
Figure 5D:
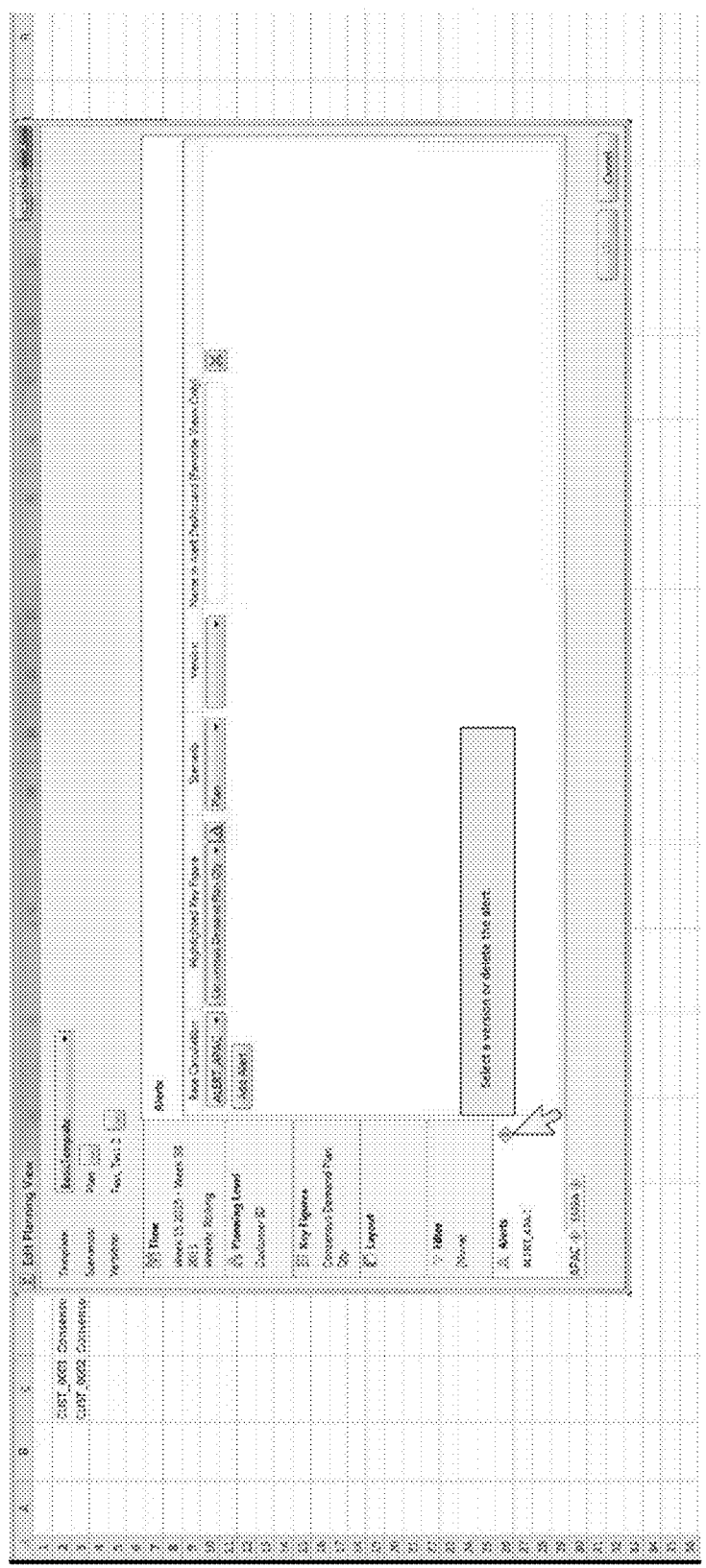
Figure 5E:
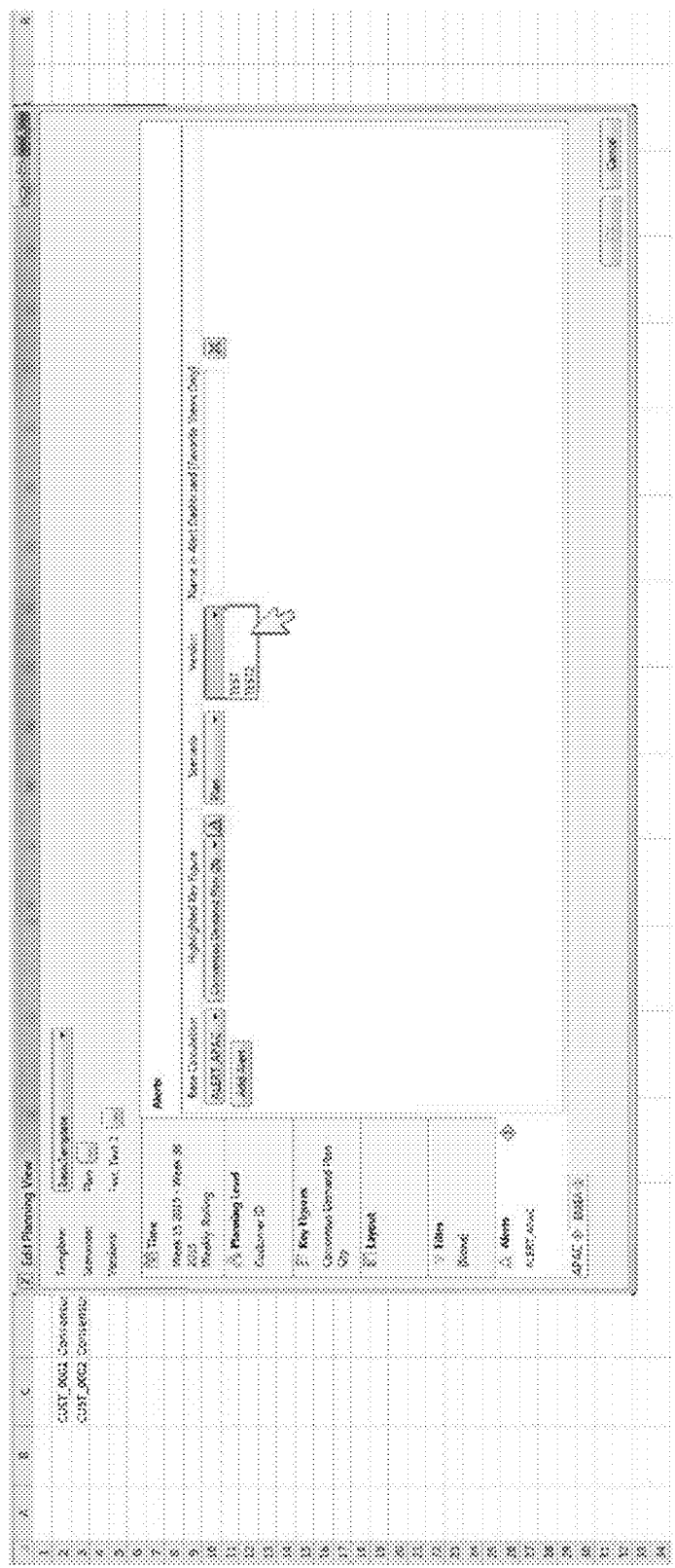

FIG. 5b illustrates an exemplary user interface 504, where the user has determined to change the "version" setting from "Baseline" (as selected in the user interface 502) to "version" settings "Test" and "Test 2". Once the user has selected these new "version" settings, the "OK" button can be deactivated and a notification to the user can be generated (for example, indicating that "The system found issues with your planning view settings. To enable the "OK" button, resolve all issues."), as shown by the user interface 506 in FIG. 5c. As shown in FIG. 5c, since the "version" settings have changed from "Baseline" to "Test" and "Test 2", the "alerts" settings needs to be adjusted, which is shown by an error icon in the "Alerts" tab. Other settings may also need to be changed depending on the selected configurations. For example, the "Alerts" setting can be dependent on a particular "version" setting (i.e., "Test" or "Test 2") that may selected. As shown in FIG. 5d, the user interface 508 can display a notification (e.g., an icon with a tooltip, etc.) containing an error message stating "Select a version or delete the alert". The user can then select the "version" setting (i.e., "Test" or "Test 2"), as shown by the user interface 510 in FIG. 5e.

Figure 5F:
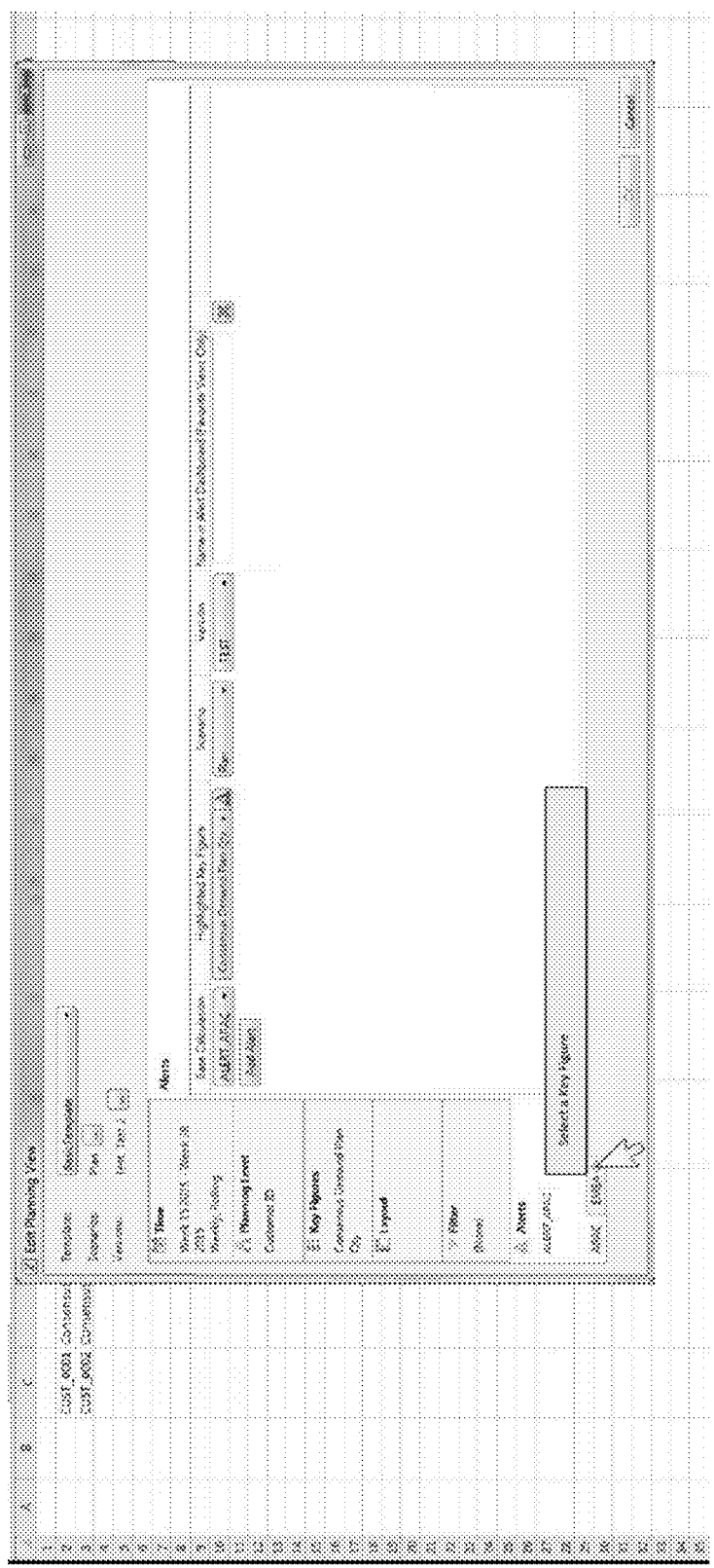

As shown in FIG. 5f, the user interface 512 can display a notification containing an error message prompting the user to select a "key figure" setting. Once the user has selected a particular "version" setting and the "alerts" setting, the system can be reconfigured accordingly. Once the specific setting has been adjusted, the notification related to that setting (which may be associated with that setting and/or any other setting) is resolved and no longer appears on the user interface. Other existing notifications can remain and/or can be resolved as well through user's action with regard to the adjustment of another setting. The system can also perform further checking to determine whether there are any other conflicts, which can include existing and/or new conflicts. For example, upon the user selecting a particular "version" setting and/or "alerts" setting, a previous notification relating to selection of a "version" setting/deletion of an "alert" setting is resolved. However, another error and corresponding existing notification relating to selection of a "key figure" setting (as shown in FIG. 5f) remains unresolved. Thus, since other errors and corresponding notifications remain (e.g., selection of "key figure" setting), the "OK" button continues to be disabled, preventing the user to accept all settings at this time.

Figure 5G:
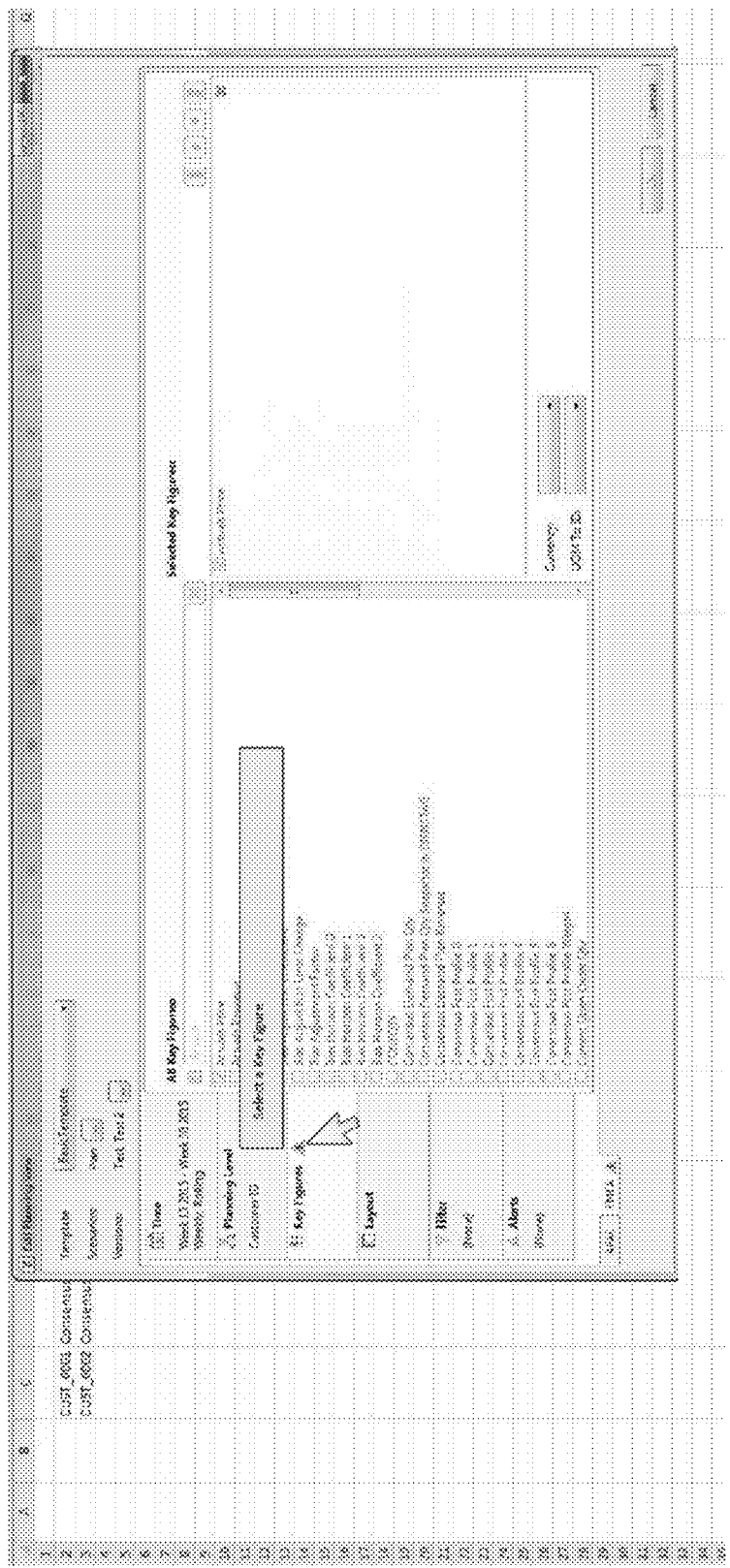
Figure 5H:
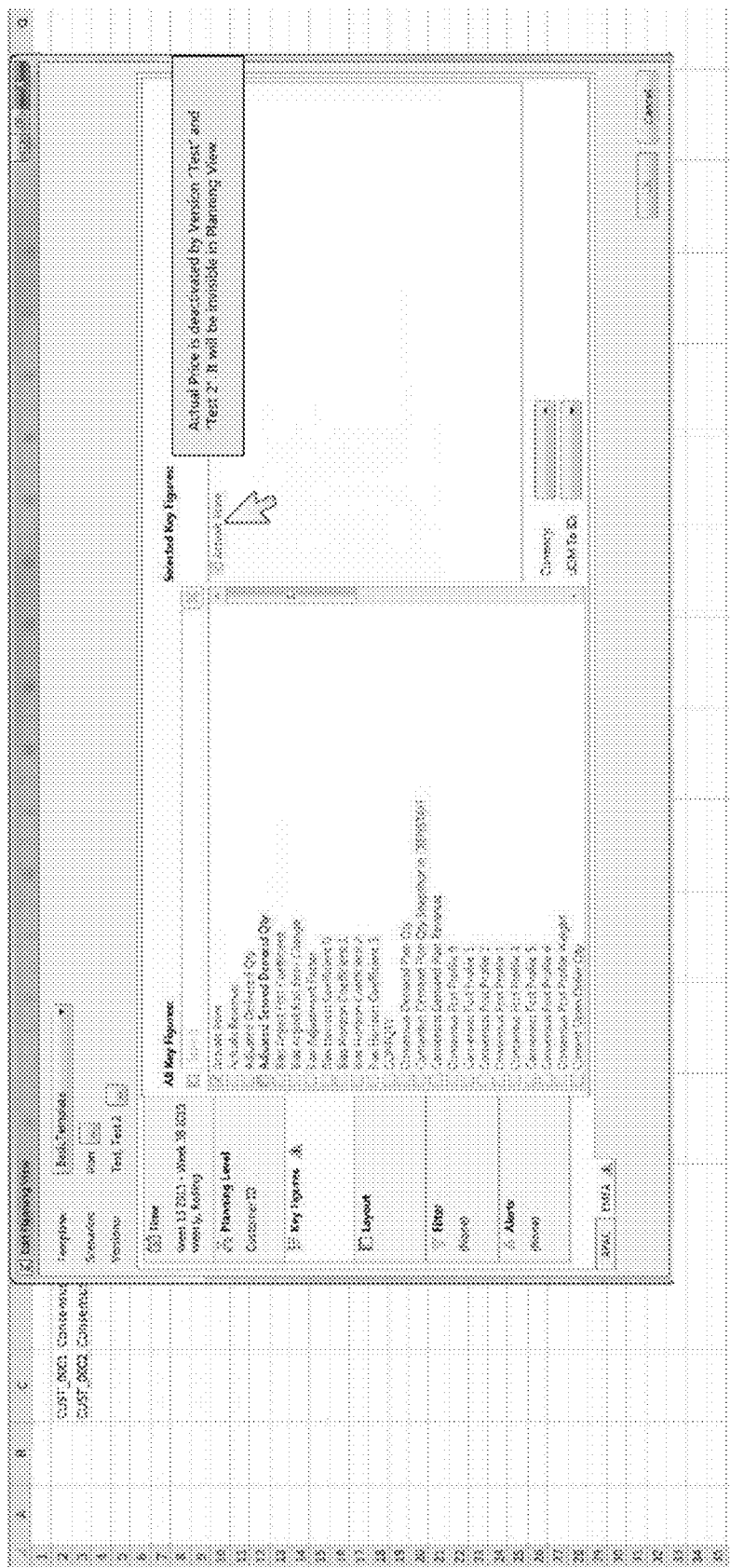
Figure 5I:
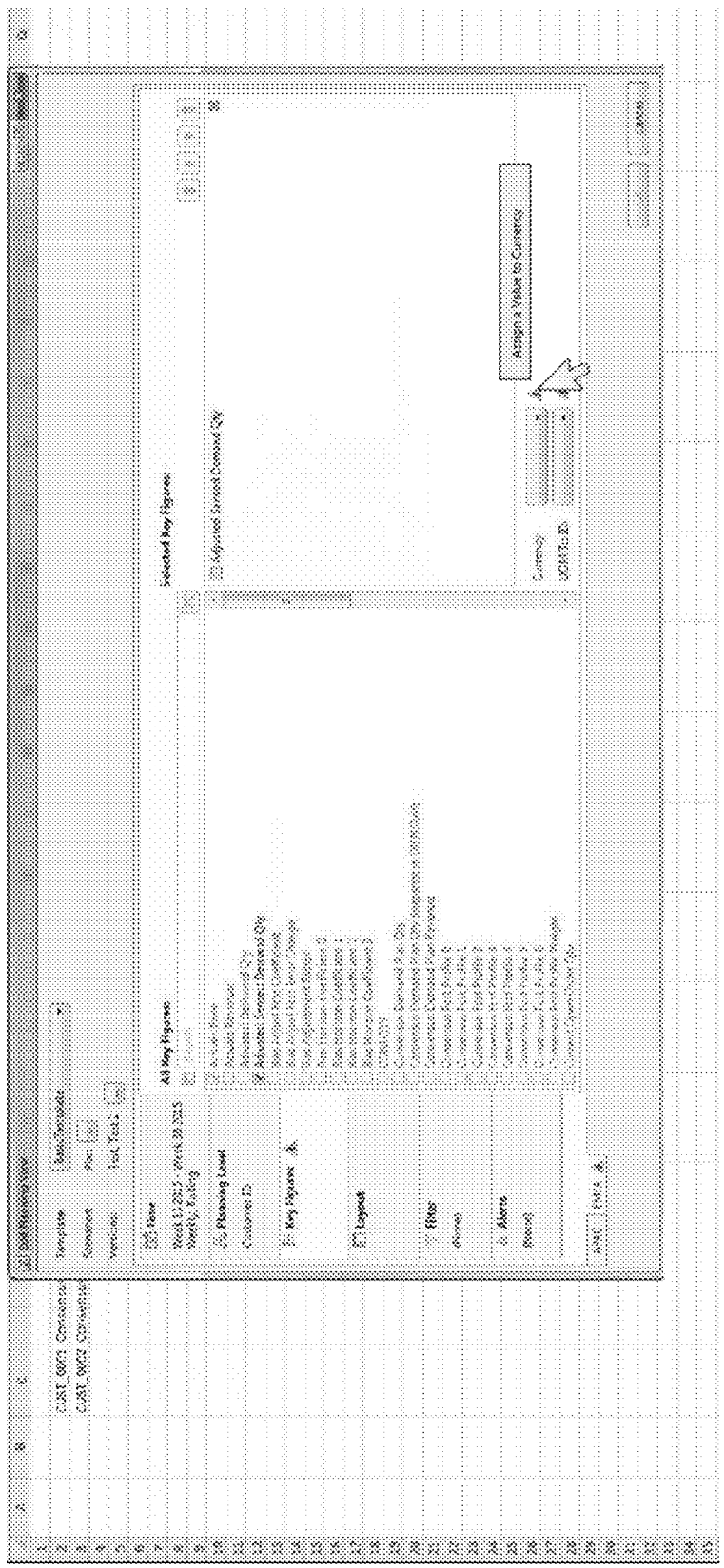
Figure 5J:
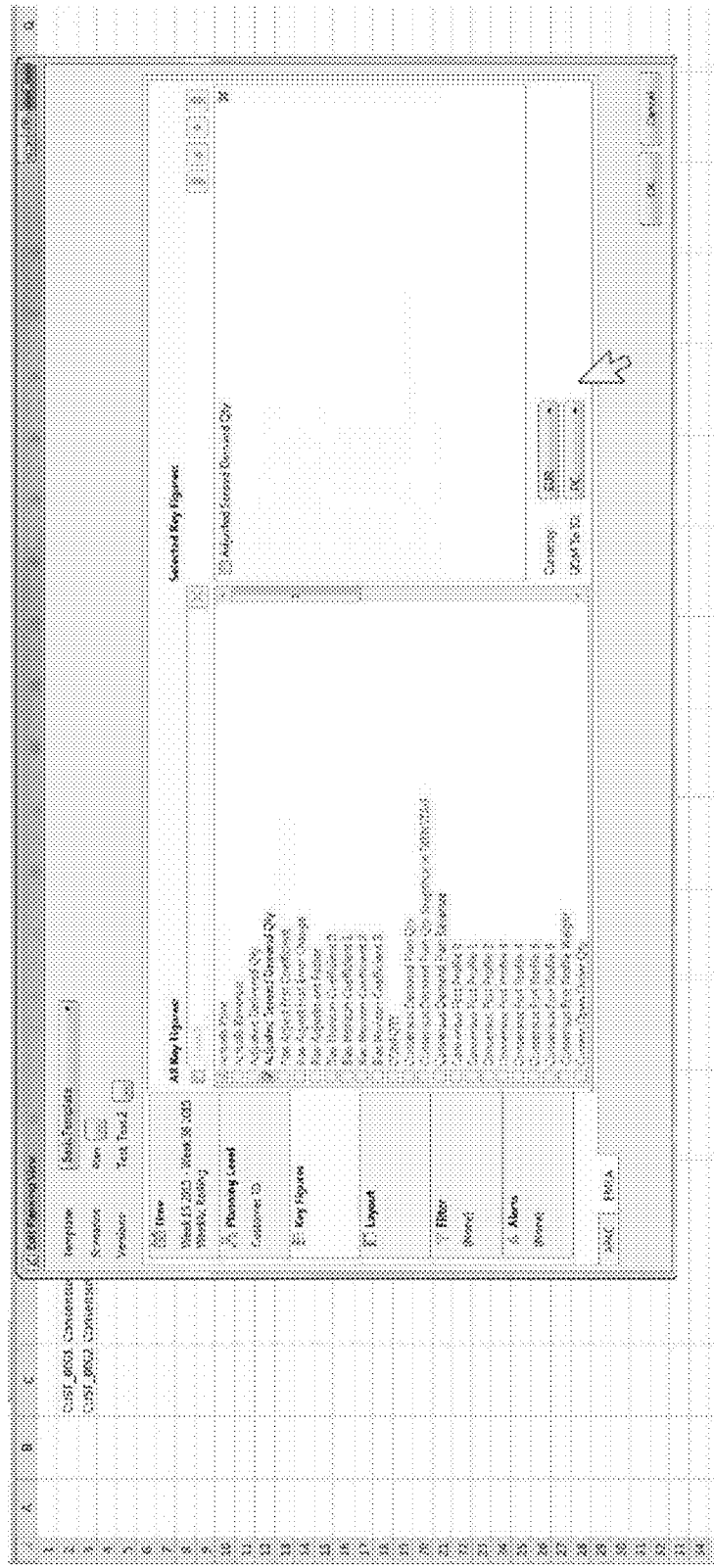

As shown in FIG. 5g, the user interface 514 can then display a notification containing an error message prompting the user to select a "key figure" setting from a list of key figures (e.g., "Actual Price", "Actual Revenue", etc.). Once the user has selected one or more key figures, the system can perform a dependency check and generate further notifications. For example, upon the user adjusting the "key figure" setting to "Actual Price", that setting becomes valid and acceptable by the system. Such acceptance can be in view of other settings that may have been selected and/or adjusted by the user. However, if one or more of the other settings is changed, another setting that was previously deemed valid becomes invalid and an appropriate notification can be generated. For example, upon the "Actual Price" "key figure" setting being determined to be valid, the user determines to change the "version" setting from "Baseline" to "Test" or "Test2". This action renders the previously valid "Actual Price" "key figure" setting invalid, and an appropriate notification indicative of the error is generated. As shown in FIG. 5h, the user interface 516 can display a notification with regard to the selected "key figure" setting "Actual Price". FIG. 5i illustrates an exemplary user interface 518 prompting the user to resolve further errors with regard to selected "key figures" settings (e.g., "Assign a Value to Currency"). Once all errors have been resolved, the "OK" button becomes active, as illustrated in the user interface 520 shown in FIG. 5j.

In some implementations, during this process, the current subject matter system can continuously perform dependency checks and determine whether or not there are violations (based on specific rules, settings, values, etc.) and providing user with notifications containing guidance as to how to resolve specific violations. The resolution can be automatic and/or can be manual and/or both. Upon determining that no violations exist, the system can allow acceptance of all settings.

Figure 6:
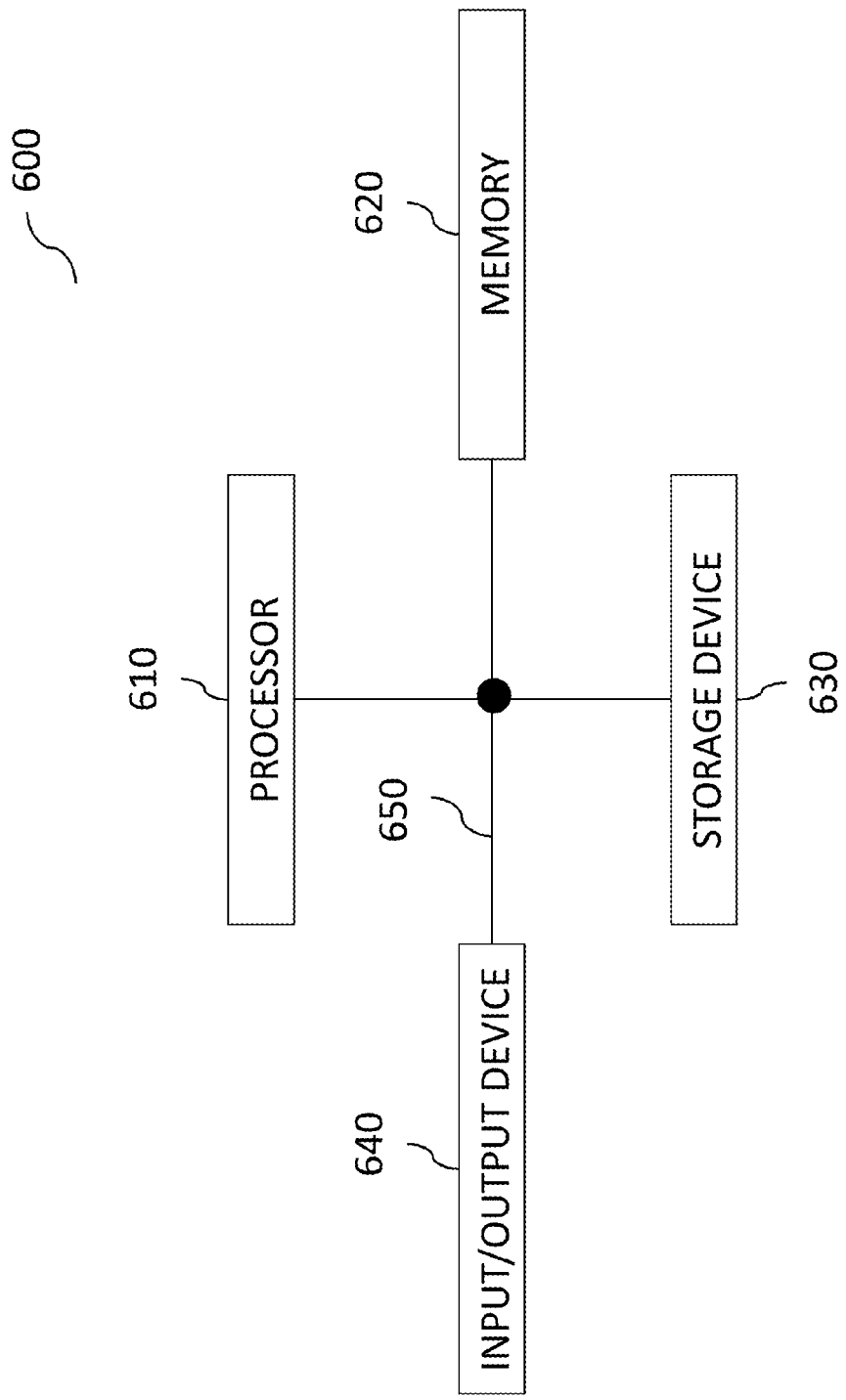
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
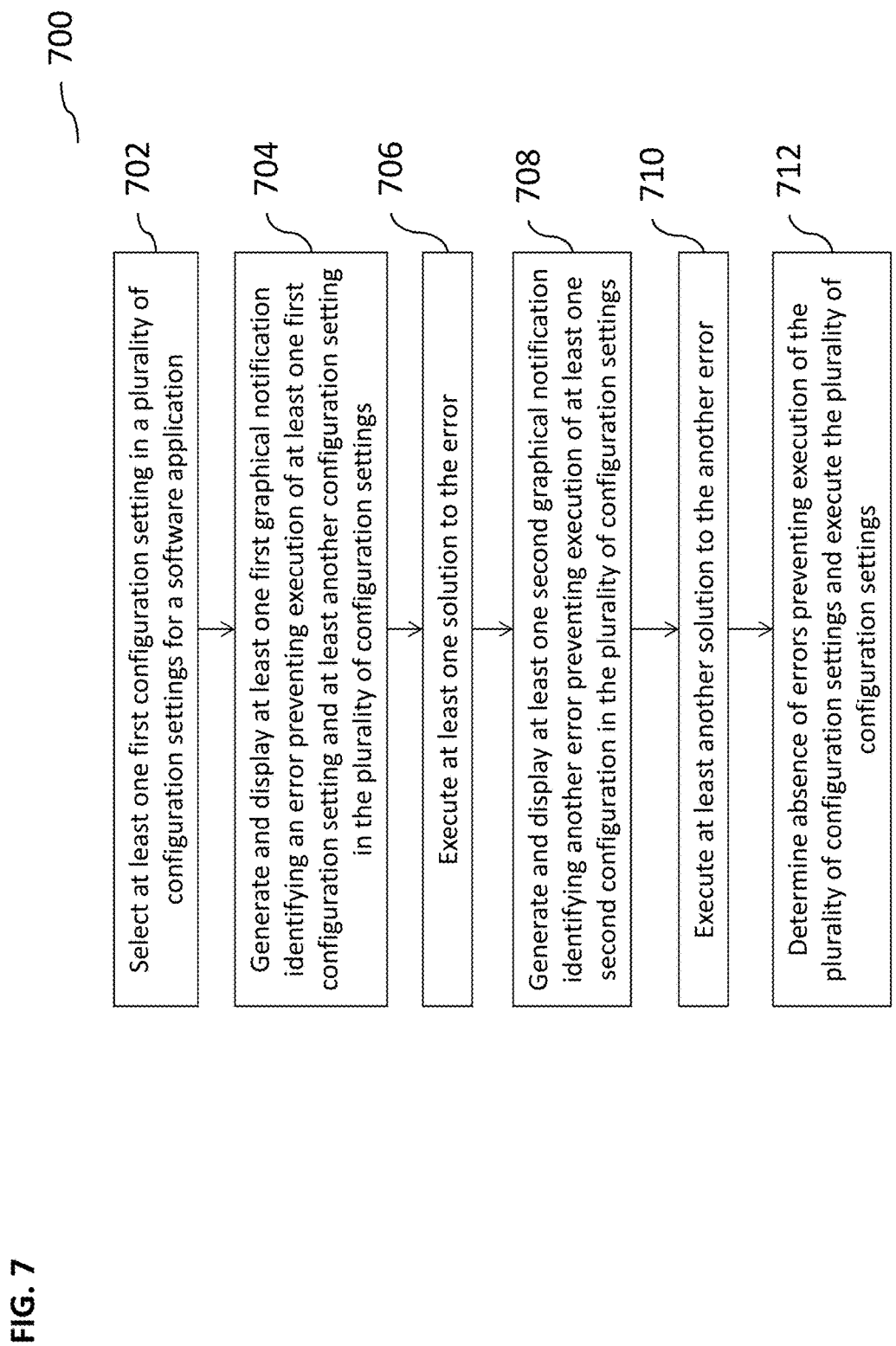
FIG. 7 illustrates an exemplary method, according to some implementations of the current subject matter.

FIG. 7 illustrates an exemplary method 700 for performing error handling/resolution in computing systems, according to some implementations of the current subject matter. At 702, at least one first configuration setting in a plurality of configuration settings (e.g., "Version" setting, as shown in FIGS. 5a-j) for a software application can be selected. At 704, at least one first graphical notification identifying an error preventing execution of the first configuration setting and/or another configuration setting in the plurality of configuration settings can be generated and displayed (e.g., in a tooltip of an icon). For example, the selected "Version" setting can affect the "Alerts" setting (see, e.g., FIGS. 5a-j), and an appropriate notification can be displayed to the user (e.g., when the user adjusts one setting, but then changes another setting, thereby rendering the first setting that was adjusted invalid). At 706, at least one solution to the error displayed in the notification (see, e.g., various notifications shown in FIGS. 5a-j) can be executed (e.g., user adjusting a "key figure" setting). In some implementations, the first graphical notification can be configured to be displayed on a user interface adjacent to a graphical location on the user interface associated with the first configuration setting. At 708, at least one second graphical notification identifying another error preventing execution of a second configuration in the plurality of configuration settings can be generated and displayed based on the executed solution (e.g., user adjusting a setting). In some implementations, the second configuration setting can be dependent on the first configuration setting, which can be determined by the system through a dependency check. The error related to the second configuration can already exist in the system, but can be displayed to the user upon request (e.g., user hovering a mouse over the setting). The second graphical notification can be configured to be displayed on a user interface adjacent to a graphical location on the user interface associated with the second configuration setting. The displaying of the notifications can consume a small fraction of the user interface. At 710, at least another solution to the error displayed in the second graphical notification can be executed (e.g., the user can be guided by the tooltip as to what needs to be done and by the icon as to where it needs to be done). At 712, upon determination of absence of any further errors preventing execution of the plurality of configuration settings, the settings can be executed (e.g., the "OK" button on the user interface can become active). In some implementations, the graphical notifications can indicate to and/or guide the user which setting to adjust/change next.

In some implementations, the current subject matter can include one or more of the following optional features. In some implementations, at least one of the first configuration setting and second configuration setting can relate to at least one object (e.g., document, spreadsheet, and/or any other object) executed by the software application. At least one of the first configuration setting and second configuration setting can also relate to a plurality of objects (e.g., embedded and/or multi-level spreadsheets) executed by the software application.

In some implementations, the above selecting, generating and displaying at least one first graphical notification, executing at least one solution to the error, generating and displaying at least one second graphical notification, executing at least another solution to another error, and determining can be performed using at least one planning view generated by the software application.

In some implementations, the generated notification can include an explanation of the conflict and an indication of at least one solution to resolve the conflict.

In some implementations, the first configuration setting and/or the second configuration setting can relate to at least one of the following: a time range setting, a planning level setting, a key figure setting, a version setting, a scenario setting, an alert setting, and any combination thereof.

In some implementations, the method 700 can include preventing the executing of the plurality of the settings upon determination that at least another conflict exists between the first configuration setting and the second configuration setting.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   selecting at least one first configuration setting in a plurality of configuration settings for a multi-spreadsheet software application, the at least one first configuration setting associated with a first spreadsheet;
   comparing first values associated with the at least one first configuration setting with second values of at least another configuration setting in the plurality of configuration setting, the at least another configuration setting associated with a second spreadsheet;
   deactivating, based on determining that the first values do not match with the second values, the at least another configuration setting, the deactivating preventing selection of the at least another configuration setting;
   generating and displaying, based on determining that the first values do not match with the second values, at least one first graphical notification identifying an error preventing execution of the at least one first configuration setting and the at least another configuration setting, the at least one first graphical notification is configured to be displayed on a user interface adjacent to a graphical location on the user interface associated with the at least another configuration setting;
   executing, based on the at least one generated first graphical notification, at least one solution to the error; and
   determining absence of errors preventing execution of the plurality of configuration settings and executing the plurality of configuration settings;
   wherein at least one of the selecting, the comparing, the determining, the generating and displaying, the executing, and the determining is performed using at least one processor of at least one computing system.

2. The method according to claim 1, wherein the determining comprises:
   generating and displaying, based on the executed at least one solution, at least one second graphical notification identifying another error preventing execution of at least one second configuration in the plurality of configuration settings, the at least one second configuration setting being dependent on the at least one first configuration setting, the at least one second graphical notification is configured to be displayed on the user interface adjacent to a graphical location on the user interface associated with the at least one second configuration setting; and
   executing, based on the at least one generated second graphical notification, at least another solution to the another error.

3. The method according to claim 2, wherein at least one of the at least one first configuration setting and at least one second configuration setting relate to at least one object executed by the software application.

4. The method according to claim 2, wherein at least one of the at least one first configuration setting and at least one second configuration setting relate to a plurality of objects executed by the software application.

5. The method according to claim 1, wherein at least one of the selecting, the comparing, the determining, the generating and displaying, the executing, and the determining is performed using at least one planning view generated by the software application.

6. The method according to claim 2, wherein at least one of the first graphical notification and the at least one of the second graphical notification include an explanation of the at least one conflict and an indication of at least one solution to resolve the at least one conflict.

7. The method according to claim 2, wherein at least one of the at least one first configuration setting and at least one second configuration setting relate to at least one of the following: a time range setting, a planning level setting, a key figure setting, a version setting, a scenario setting, an alert setting, and any combination thereof.

8. The method according to claim 2, further comprising preventing the executing of the plurality of configuration settings upon determination that at least another conflict exists between the at least one first selected configuration setting and the at least one second configuration setting.

9. A system comprising:
at least one programmable processor; and
a machine-readable medium storing instructions that, when executed by the at least one programmable processor, cause the at least one programmable processor to perform operations comprising:
selecting at least one first configuration setting in a plurality of configuration settings for a multi-spreadsheet software application, the at least one first configuration setting associated with a first spreadsheet;
comparing first values associated with the at least one first configuration setting with second values of at least another configuration setting in the plurality of configuration settings, the at least another configuration setting associated with a second spreadsheet;
deactivating, based on determining that the first values do not match with the second values, the at least another configuration setting, the deactivating preventing selection of the at least another configuration setting;
generating and displaying, based on determining that the first values do not match with the second values, at least one first graphical notification identifying an error preventing execution of the at least one first configuration setting and the at least another configuration setting, the at least one first graphical notification is configured to be displayed on a user interface adjacent to a graphical location on the user interface associated with the at least another configuration setting;
executing, based on the at least one generated first graphical notification, at least one solution to the error; and
determining absence of errors preventing execution of the plurality of configuration settings and executing the plurality of configuration settings.

10. The system according to claim 9, wherein the determining comprises:
generating and displaying, based on the executed at least one solution, at least one second graphical notification identifying another error preventing execution of at least one second configuration in the plurality of configuration settings, the at least one second configuration setting being dependent on the at least one first configuration setting, the at least one second graphical notification is configured to be displayed on the user interface adjacent to a graphical location on the user interface associated with the at least one second configuration setting; and
executing, based on the at least one generated second graphical notification, at least another solution to the another error.

11. The system according to claim 10, wherein at least one of the at least one first configuration setting and at least one second configuration setting relate to at least one object executed by the software application.

12. The system according to claim 10, wherein at least one of the at least one first configuration setting and at least one second configuration setting relate to a plurality of objects executed by the software application.

13. The system according to claim 9, wherein at least one of the selecting, the comparing, the determining, the generating and displaying, the executing, and the determining is performed using at least one planning view generated by the software application.

14. The system according to claim 10, wherein at least one of the first graphical notification and the at least one of the second graphical notification include an explanation of the at least one conflict and an indication of at least one solution to resolve the at least one conflict.

15. The system according to claim 10, wherein at least one of the at least one first configuration setting and at least one second configuration setting relate to at least one of the following: a time range setting, a planning level setting, a key figure setting, a version setting, a scenario setting, an alert setting, and any combination thereof.

16. The system according to claim 10, wherein the operations further comprise preventing the executing of the plurality of configuration settings upon determination that at least another conflict exists between the at least one first selected configuration setting and the at least one second configuration setting.

17. A computer program product comprising a non-transitory machine-readable medium storing instructions that, when executed by at least one programmable processor, cause the at least one programmable processor to perform operations comprising:
selecting at least one first configuration setting in a plurality of configuration settings for a multi-spreadsheet software application, the at least one first configuration setting associated with a first spreadsheet;
comparing first values associated with the at least one first configuration setting with second values of at least another configuration setting in the plurality of configuration setting, the at least another configuration setting associated with a second spreadsheet;
deactivating, based on determining that the first values do not match with the second values, the at least another configuration setting, the deactivating preventing selection of the at least another configuration setting;
generating and displaying, based on determining that the first values do not match with the second values, at least one first graphical notification identifying an error preventing execution of the at least one first configuration setting and the at least another configuration setting, the at least one first graphical notification is configured to be displayed on a user interface adjacent to a graphical location on the user interface associated with the at least another configuration setting;
executing, based on the at least one generated first graphical notification, at least one solution to the error; and
determining absence of errors preventing execution of the plurality of configuration settings and executing the plurality of configuration settings.

18. The computer program product according to claim 17, wherein the determining comprises:
generating and displaying, based on the executed at least one solution, at least one second graphical notification identifying another error preventing execution of at least one second configuration in the plurality of configuration settings, the at least one second configuration setting being dependent on the at least one first configuration setting, the at least one second graphical notification is configured to be displayed on the user interface adjacent to a graphical location on the user interface associated with the at least one second configuration setting; and executing, based on the at least one generated second graphical notification, at least another solution to the another error.

19. The computer program product according to claim 18, wherein at least one of the at least one first configuration setting and at least one second configuration setting relate to at least one object executed by the software application.

20. The computer program product according to claim 18, wherein at least one of the at least one first configuration setting and at least one second configuration setting relate to a plurality of objects executed by the software application.

* * * * *